United States Patent [19] | [11] 4,042,394
Smith, Jr. et al. | [45] Aug. 16, 1977

[54] PHOTOGRAPHIC DYE IMAGE STABILIZATION

[75] Inventors: Wendell F. Smith, Jr., Fairport; Kenneth L. Eddy, Canadaigua; Donald P. Harnish, Rochester, all of N.Y.

[73] Assignee: Eastman Kodak Company, Rochester, N.Y.

[21] Appl. No.: 546,659

[22] Filed: Feb. 3, 1975

Related U.S. Application Data

[63] Continuation-in-part of Ser. No. 357,563, May 7, 1973, abandoned.

[51] Int. Cl.[2] .......... G03C 7/00
[52] U.S. Cl. .......... 96/56; 96/100 R; 96/77; 428/207
[58] Field of Search .......... 96/77, 74, 55, 56.1, 96/9, 100, 84 R, 56, 89, 91 N; 8/65, 74, 25; 428/207

[56] References Cited

U.S. PATENT DOCUMENTS

| | | | |
|---|---|---|---|
| 2,350,380 | 6/1944 | White | 96/74 |
| 2,689,180 | 9/1954 | Friedman | 96/74 |
| 2,808,329 | 10/1957 | Whitmore | 96/9 |
| 3,180,734 | 4/1965 | Willems et al. | 96/100 |
| 3,227,554 | 1/1966 | Barr et al. | 96/55 |
| 3,265,503 | 8/1966 | Bodmer et al. | 96/74 |
| 3,432,300 | 3/1969 | Lestina et al. | 96/74 |
| 3,615,602 | 10/1971 | Gredner et al. | 96/100 |
| 3,642,485 | 2/1972 | Oishi et al. | 96/100 |
| 3,790,379 | 2/1974 | Oishi et al. | 96/9 |

FOREIGN PATENT DOCUMENTS

| | | | |
|---|---|---|---|
| 2,302,661 | 0000 | Germany | 96/9 |

*Primary Examiner*—Won H. Louie, Jr.
*Attorney, Agent, or Firm*—J. J. Ruch

[57] ABSTRACT

A photographic element is disclosed comprised of a support and at least one layer containing a photographic imaging dye or its precursor. The imaging dye is chosen to have an absorption peak below 590 nm. An azomethine dye having an absorption peak above 700 nm is associated with the imaging dye or its precursor within the photographic layer. The azomethine dye reduces the rate of fading of the imaging dye upon exposure to visible light. A process for stabilizing a photographic dye image is also disclosed.

27 Claims, No Drawings

PHOTOGRAPHIC DYE IMAGE STABILIZATION

CROSS-REFERENCE TO RELATED APPLICATION

This is a continuation-in-part of Ser. No. 357,563, now abandoned, filed May 7, 1973, titled STABILIZED DYES.

BACKGROUND OF THE INVENTION

1. Field of the Invention

This invention relates to the stabilization with respect to electromagnetic radiation of organic compounds, particularly to the stabilization of dyes used in photographic applications, especially those used in photographic elements.

2. Description of the Prior Art

A need has been long recognized in the photographic arts for imaging dyes which are more resistant to fading upon extended exposure to electromagnetic radiation, such as ambient light. It is common practice to form color photographic images using combinations of dyes which form subtractive primary colors. Such subtractive primary dyes are those which absorb light predominantly in one of the blue, green and red triads of the visible spectrum thereby appearing yellow, magenta or or cyan, respectively. In the most common arrangement these subtractive primary dyes lie in separate layers of the photographic element. In such photograhic elements the magenta dyes have shown a particular propensity toward fading upon prolonged exposure to light.

One approach toward solving the disadvantages of dye fading in photographic elements has been to devise dyes of improved stability. Lestina U.S. Pat. No. 3,519,429, issued July 7, 1970, and Weissberger et al U.S. Pat. No. 3,062,653, issued Nov. 6, 1962, are illustrative of patents teaching the formation of stabilized magenta dyes through the formation of novel magenta-dye-forming couplers.

Another approach to solving the disadvantage of dye fading in photographic elements has been to reduce the amount of ultraviolet light contacting the imaging dyes. This can be accomplished by providing the photographic element with an ultraviolet light filter as an overcoat to the dye image-forming layers.

It is also known to place stabilizing compounds in combination with imaging dyes directly within the image-forminglayers of photographic elements. Such stabilizers are capable of protecting the imaging dyes to some extent against fading in response to extended exposure to visible and ultraviolet light. These stabilizers are characterized by fused heterocyclic ring systems and are typically phenolic type compounds. Exemplary stabilizers of this type are disclosed in Lestina et al U.S. Pat. Nos. 3,432,300; 3,573,050 and 3,698,909, issued Mar. 11, 1969; Mar. 30, 1971; and Oct. 17, 1972, respectively.

It is known to form dye images in photographic elements by placing in a single imaging layer combinations of couplers capable of forming imaging dyes upon development. One very common illustration of such photographic elements are those which incorporate into a photographic imaging layer a combination of colored and uncolored couplers. The colored couplers have as their purpose to minimize the imagewise formation of unwanted color in photographic negative resulting from light absorption by the dye formed from the uncolored coupler outside of the desired absorption triad of the visible spectrum. Illustrative of patents which teach the combination of couplers which are colored and uncolored for the purpose of masking unwanted dye absorption are Vittum et al U.S. Pat. No. 2,428,054, issued Sept. 30, 1947; Whitmore U.S. Pat. No. 2,808,329, issued Oct. 1, 1957; Jaeken et al U.S. Pat. Nos. 3,525,614 and 3,535,113, issued Aug. 25, 1970 and Oct. 20, 1970, respectively; Oishi et al U.S. Pat. No. 3,642,485, issued Feb. 15, 1972; Guzzi et al U.S. Pat. No. 3,647,468, issued Mar. 7, 1972 and Otto et al U.S. Pat. 3,671,257, issued June 20, 1972.

It also known in the art to incorporate into a single imaging layer of a photographic element imaging dyes which absorb predominantly in different triads of the visible spectrum. Bodmer et al U.S. Pat. No. 3,265,503, issued Aug 9, 1966 and White U.S. Pat. No. 2,350,380, issued June 6, 1944, teach placing yellow and magenta dye-forming couplers in a single imaging layer of a photographic element. Friedman U.S. Pat. No. 2,689,180, issued Sept. 14, 1954, teaches forming gray dye images by placing a mixture of yellow, magenta and cyan-dye-forming couplers in a single imaging layer of a photographic element. Barr et al U.S. Pat. No. 3,277,554, issued Jan. 4, 1966, teaches placing magenta and yellow as well as cyan and yellow-dye-forming couplers in a single layer of a photographic element. Barr et al also teaches placing within a single layer of a photographic element couplers intended to form imaging dyes and couplers intended to release development modifying moieties, such as mercaptans.

Since infrared radiation is not visible to the human eye, this portion of the spectrum is usually ignored or assigned little importance in constructing photographic elements capable of producing dye images. Generally the infrared portion of the electromagnetic spectrum has been usefully employed only for specialized photographic applications. Woodward et al U.S. Pat. No. 2,927,024, issued March 1, 1960, places a combination of yellow and magenta-dye-forming couplers in an infrared sensitized silver halide emulsion layer for the purpose of masking unwanted absorption by the imaging dyes in the imaging layer of the photographic element. In German Pat. No. 2,302,661, a color photographic element is disclosed formed of three separate subtractive primary dye-forming imaging layers. For the purpose of forming an integral sound track in the photographic element which will provide adequate density when scanned with an infrared radiation source, it is taught to incorporate an infrared absorbing dye-forming coupler. The coupler can be incorporated in the red-sensitized layer of the photographic element to serve as the cyan dye-forming coupler as well as providing its infrared absorbing function or can be placed in the red-sensitized layer of the photographic element in combination with a conventional cyan dye-forming coupler.

SUMMARY OF THE INVENTION

The present invention relates to improving the stability to visible and ultraviolet light of photographic imaging dyes having an absorption peak below 590 nm. This improvement is brought about by the presence of an azomethine dye, herein termed a quenching dye or quencher, having a spectrophotometric absorption peak above 700 nm.

In one aspect this invention is directed to a photographic element comprised of a support and at least one layer containing a photographic imaging dye or precursor thereof. The imaging dye exhibits an absorption peak below 590 nm. An azomethine dye having an absorption peak above 700 nm or a precursor thereof is associated with the imaging dye within the layer in an amount sufficient to reduce the rate of fading of a photographic image produced by the imaging dye upon exposure to visible light.

In another aspect this invention is directed to a method for preserving the appearance upon exposure to visible or ultraviolet radiation of a photographic element containing an imaging dye having its longest wavelength absorption peak below 590 nm. This method is comprised of associating with the imaging dye in an amount sufficient to reduce the rate of fading thereof an azomethine quenching dye having its absorption peak above 700 nm.

DESCRIPTION OF THE PREFERRED EMBODIMENTS

As employed herein the term "dye" is used to designate compounds having an absorption peak within the visible or infrared portions of the electromagentic spectrum. The term "imaging dye" refers to conventional dyes which have been employed to form photographic images which can be seen with the eye in viewing a photographic element. The imaging dyes employed in the practice of this invention are those which exhibit an absorption peak below 590 nm in wavelength. The azomethine quenching dyes are those which exhibit an absorption peak above 700 nm in wavelength. For purposes of defining this invention, the term "absorption peak" refers to the principle or major absorption peak of the dye and excludes secondary or minor absorption peaks. The preferred quenching dyes are those which are free of minor absorption peaks within the visible spectrum.

Any conventional photographic imaging dye having an absorption peak below 590 nm can be stabilized in a photographic element according to this invention by associating therewith as a quencher an azomethine dye having an absorption peak above 700 nm. While the imaging and quenching dyes can be employed in any convenient conventional form, for most color photographic applications it is preferred to incorporate a precursor of the imaging or quenching dye in a photographic element rather than the dyes themselves. In one convenient form the imaging and/or quenching dyes can be incorporated in the form of coupler precursors--that is, in the form of conventional photographic couplers which are capable of reacting with oxidized primary aromatic amine developing agents to form imaging or quenching dyes.

Dyes contemplated for use in the practice of this invention are azine dyes, oxazine dyes, thiazine dyes, anthraquinone dyes, azo dyes, azomethine dyes (including indoaniline), cyanine dyes, diphenylmethane dyes, triphenylmethane dyes, formazan dyes, induline dyes, indigoid dyes, phthalein dyes, pyronine dyes, and the like, as well as precursors thereof, such as couplers which can form such dyes within a photographic imaging layer.

Couplers suitable for use in the present invention include those forming yellow, magenta, cyan and infrared absorbing dyes. The couplers can be of the so called 4-equivalent type or of the 2-equivalent type as described, for instance, in Loria U.S. Pat. Nos. 3,277,155 and 3,458,315.

The yellow-dye-forming couplers generally contain methylene groups activated by at least one carbonyl group (e.g., open chain ketomethylene groups) and include beta diketones and beta ketoacylamides, such as benzoylacetanilides, as well as alpha-pivalylacetanilines. Suitable coupler moieties can be found, for instance, in U.S. Pat. Nos. 2,428,054; 2,499,966; 2,453,661; 2,778,658; 2,908,573; 3,227,550; 3,253,934; 3,277,155; 3,384,657 and British Pat. No. 503,752.

Corresponding magenta-forming couplers such as the 5-pyrazolones can also be employed in the present invention. Moieties of this type are exemplified, for instance in U.S. Pat. Nos. 2,600,788; 2,725,292; 2,908,573; 3,006,759; 3,062,653; 3,152,896, 3,227,550; 3,252,924 and 3,311,476. Includable within the above class of magenta-forming couplers are indazolones of the type referred to by Vittum and Weissburger in "Journal of Photographic Science", Vol. 6, 1958, pages 158 et seq.; pyrazolino-benzimidazoles disclosed, for instance, in U.S. Pat. No. 3,061,432; pyrazolotriazoles, exemplified in Belgian Pat. No. 724,427; and 2-cyanoacetyl coumarones as exemplified, for instance, in U.S. Pat. No. 2,115,394.

Cyan and infrared absorbing dye-forming couplers useful in the practice of this invention include phenolic and alpha naphtholic compounds which are capable of reacting with oxidized color developing agents to obtain indoaniline type dyes. Compounds of this type are specifically exemplified in U.S. Pat. Nos. 2,275,292; 2,423,730; 2,474,293; 2,895,826; 2,908,573; 3,043,892; 3,227,550 and 3,253,294 ad well as German Patent 2,302,661, cited above.

Such coupler compounds, as a general class, are further described, for instance on pages 822-5, Vol. 5, Kirk-Othmer, *Encyclopedia of Chemical Technology* and in Glafkides *Photographic Chemistry*, Vol. 2, pages 596,614.

As mentioned above, where such couplers are used in the practice of this invention, dyes are formed therefrom by reaction with oxidized aromatic primary amine color-forming silver halide agents. The developing agents include aminophenols and phenylenediamines, such as N,N-diethyl-p-phenylenediamine, N-methyl-p-phenylenediamine, N,N-dimethyl-p-phenylenediamine, 2-amino-5-diethylaminotoluene, 2-amino-5-(N-ethyl-N-laurylamino) toluene, 4-[N-ethyl-N-(beta-hydroxyethyl)amino]aniline, N-ethyl-N-beta-(methylsulfonamido)ethyl-3-methyl-4-aminoaniline and the like.

Of the foregoing dyes (which include the reaction products of the above-mentioned couplers and developing agents), the preferred ones for use as imagining dyes in the practice of this invention are the anthraquinone dyes, the azine dyes, the azo dyes, the azomethine dyes and the formazan dyes. The most preferred dyes for use as imaging dyes in the practice of this invention are the azomethine dyes. Further, only azomethine dyes are employed as quenching dyes. As employed herein, an azomethine compound is defined as any compound having the grouping:

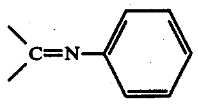

wherein the phenyl group can be unsubstituted, or substituted with any of various groups, e.g., alkyl, alkoxy, halogen, amino and the like.

Among the developing agents which can be combined with various couplers to produce quenching and imaging dyes in accordance with this invention are the following:

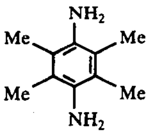

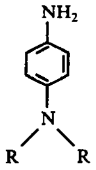

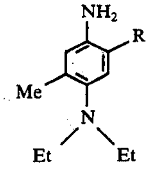

-continued

A.

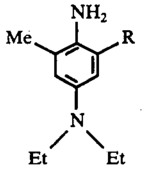

F. R = H
G. R = Me

B. R = Me
C. R = Et

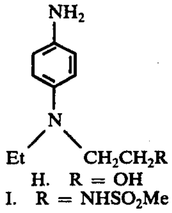

H. R = OH
I. R = $NHSO_2Me$

D. R = H
E. R = Me

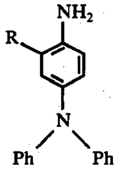

J. R = H
K. R = Me

As exemplary of couplers which can be reacted with the foregoing or other developing agents to form the quenching or imaging dyes are the following:

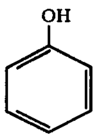

1.

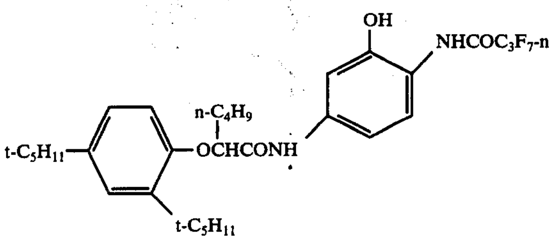

2.

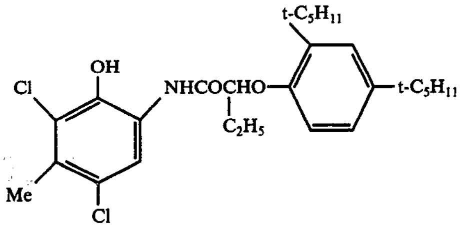

3.

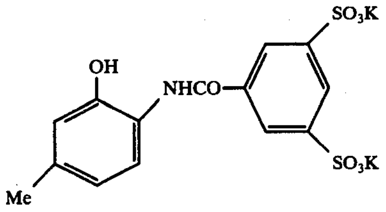

4.

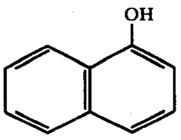

5.

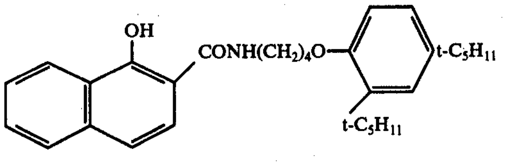

6.

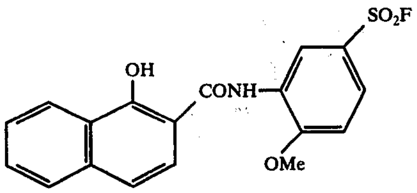

7.

-continued
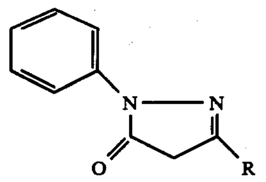
8. R = H
9. R = Me
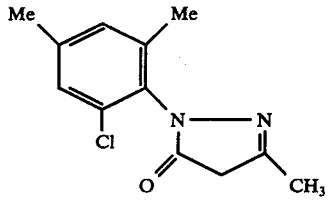
10.
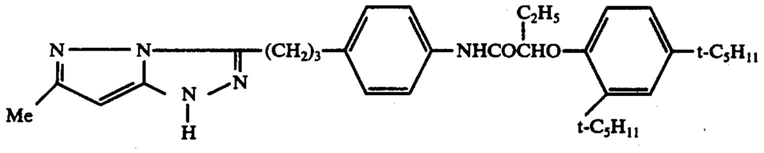
11.
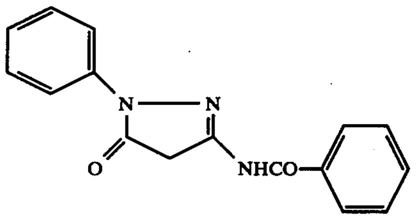
12.
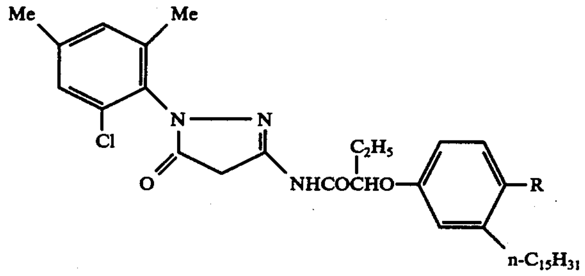
13. R = H
14. R = $SO_3H$
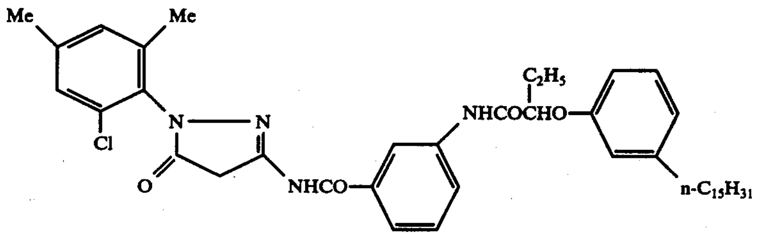
15.
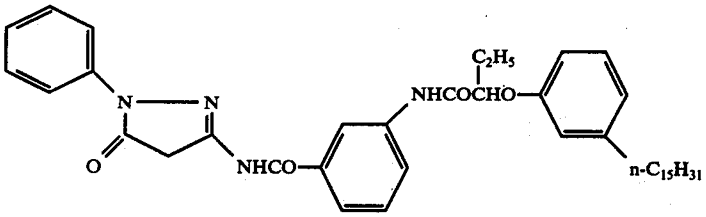
16.

-continued

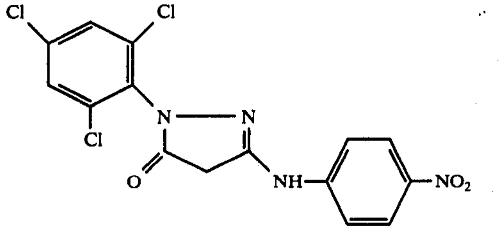

17.

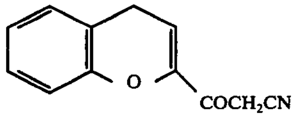

18.

$NC-CH_2-CN$

19.

20.

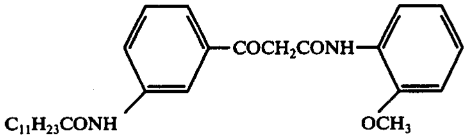

21.

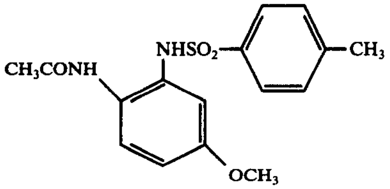

22.

In the foregoing structures, the designations Ph, Me and Et stand for phenyl, methyl ($CH_3$-) and ethyl ($Ch_3CH_2$-), respectively.

Hereinafter, these developing agents and couplers will be referred to by the letter or number given above. Further, the dyes which are the reaction products of these developing agents and couplers will be designated by the letter-number combination. For example, the dye formed by the reaction of developing agent G with coupler 9 will be referred to as G-9. It has the structure:

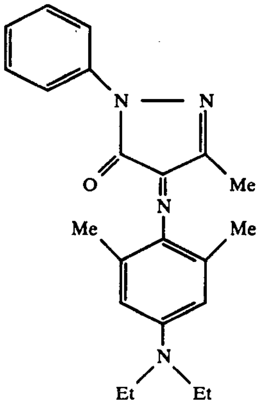

Some combinations of couplers and developing agents form cyan dyes--that is, dyes having an absorption in the red triad of the visible spectrum. We have recognized the azomethine cyan dyes to stabilize imaging dyes, but their use is not contemplated in the practice of this invention, since they generally alter the hue of the photographic dye image more than dyes which have an absorption peak in the infrared.

Among other illustrative dyes which can be employed in the practice of this invention are the following:

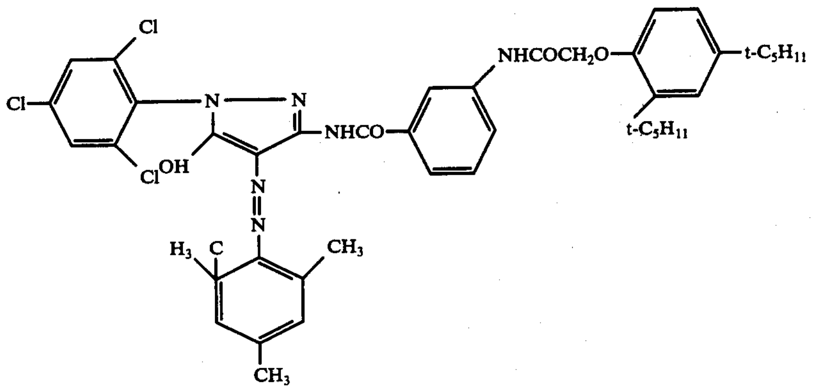
23.
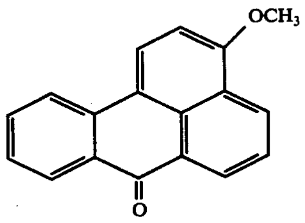
24.
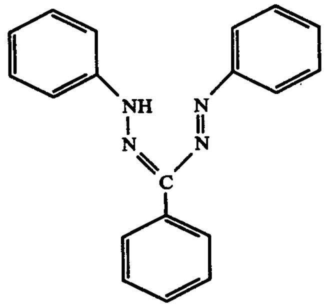
25.
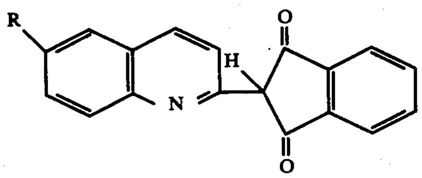
26. R = H
27. R = Me
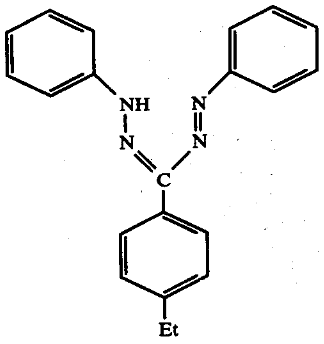
28.

-continued
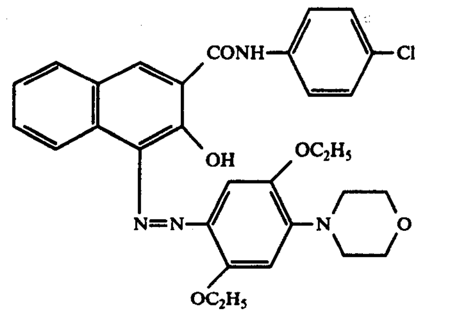
29.
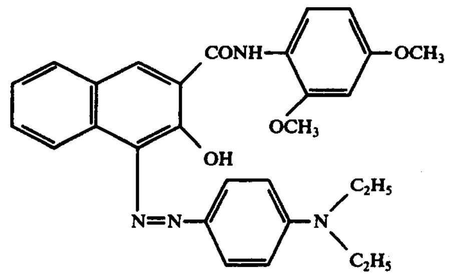
30.
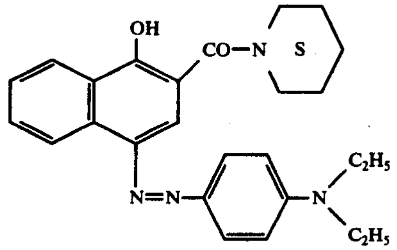
31.
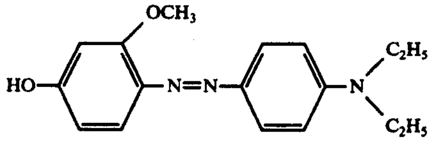
32.
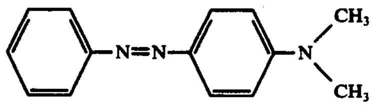
33.
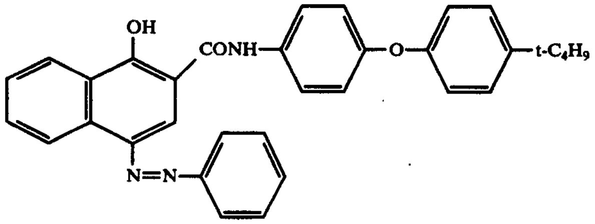
34.
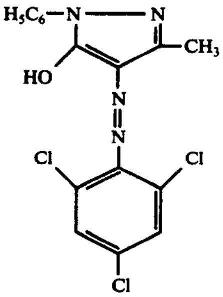
35.

-continued
36.
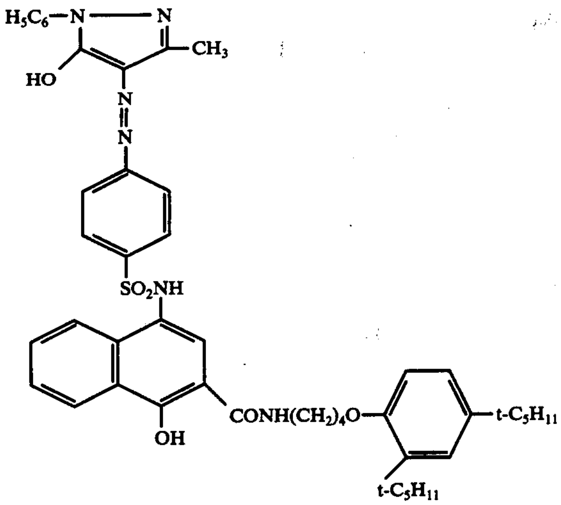
37.
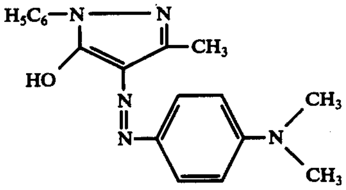
38.
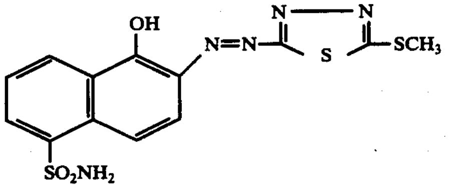
39.
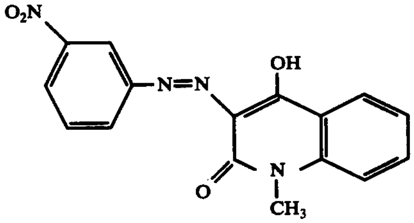
40.
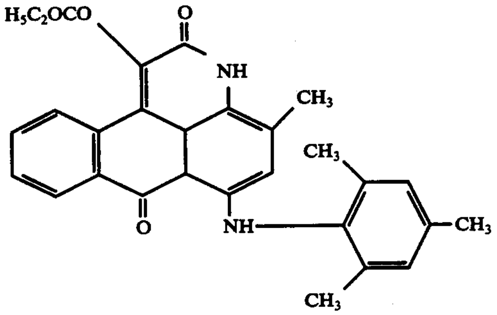
41.
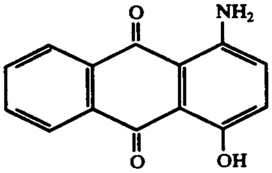

-continued

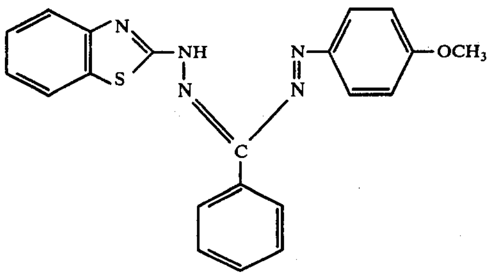

42.

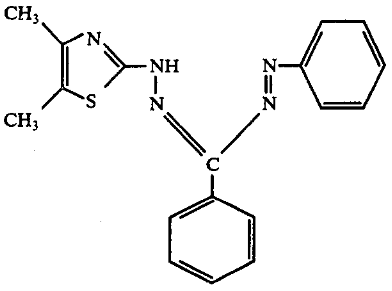

43.

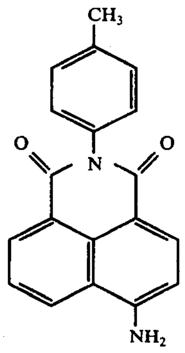

44.

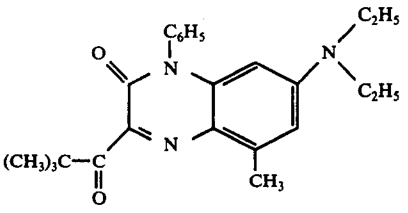

45.

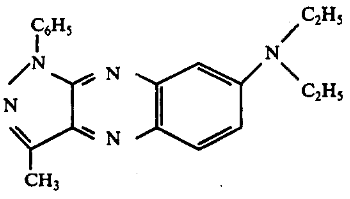

46.

Useful methods for dispersing quenching and imaging dyes or their precursors are those described in Mannes et al., U.S. Pat. No. 2,304,939 issued Dec. 15, 1942 or Jelley et al, U.S. Pat. No. 2,322,027, issued June, 15, 1943, etc., in which high-boiling organic solvents are used to dissolve the material. Other applicable methods are described in Vittum et al, U.S. Pat. No. 2,801,170 and Fierke et al, U.S. Pat. No. 2,801,171, both issued July 30, 1957, and Julian U.S. Pat. No. 2,949,360, issued August 16, 1960, in which low-boiling or water-soluble organic solvents are used with high-boiling solvent.

High-boiling solvents or dispersing media useful in dispersing the quenching and imaging dyes and their precursors include di-n-butylphthalate, benzylphthalate, triphenyl phosphate, tri-o-cresyl phosphate, diphenyl mono-p-tert-butylphenyl phosphate, monophenyl di-p-tert-butylphenyl phosphate, diphenyl mono-o-chlorophenyl phosphate, monophenyl di-o-chlorophenyl phosphate, 2,4-di-n-amylphenol, 2,4-di-t-amylphenol, N,N-diehtyllauramide, etc.

Low-boiling or water-soluble organic solvents or dispersing media which can be used to advantage in combinations with these high-boiling solvents are disclosed, for example, in Fierke et al, U.S. Pat. No. 2,801,171 And Vittum et al, U.S. Pat. No. 2,801,170, both issued July 30, 1957, and Julian U.S. Pat. No. 2,949,360, issued Aug. 16, 1960, etc.

The organic solvents or dispersing media include:

1. Low-boiling, substantially water-insoluble organic solvents, such as methyl, ethyl, propyl, and butyl acetates, isopropyl acetate, ethyl propionate, sec-butyl alcohol, ethyl formate, butyl formate, nitromethane, nitroethane, carbon tetrachloride, chloroform, etc., and 2. Water-soluble organic solvents, such as methyl isobutyl ketone, β-ethoxyethyl acetate, β-butoxy-tetrahydrofurfuryl adipate, diethyleneglycol monoacetate, methoxytriglycol acetate, acetonyl acetone, diacetone alcohol, ethylene glycol, diethylene glycol, dipropylene glycol, acetone, methanol, ethanol, acetonitrile, dimethylformamide, dioxane, etc.

The quenching dyes are located in stabilizing relation to the imaging dyes within the photographic element. This is accomplished by intimately associating the quenching dyes and/or their precursors with the imaging dyes and/or their precursors within at least one layer of the photographic element. Preferably the imaging and quenching dyes and/or their precursors lie in a common phase or dispersing medium of the layer--e.g., both within a hydrophilic colloid or latex vehicle or peptizer or both within an oleophilic solvent, such as a coupler solvent. The intimately associated quenching and imaging dyes can be present in any or all of the layers of a photographic element, but are preferably located within the imaging layers and, most preferably within the yellow and/or magenta dye imaging layers of a color photographic element. The quenching and imaging dyes and/or their precursors can be conveniently incorporated within the radiation-sensitive imaging layers of a photographic element, such as in silver halide emulsion layer. Alternately, they can be located in nonradiation-sensitive layers, such as integral or nonintegral color transfer imaging layers.

We have discovered quite unexpectedly that azomethine dyes are capable of reducing the rate of fade of the imaging dyes employed in photographic elements. By employing azomethine dyes having an absorption peak above 700 nm we are able to have the benefits of stabilizing the photographic dye image while minimizing disadvantageous alteration of the visible image. In one preferred form the azomethine quenching dyes are substantially colorless in the visible spectrum so that little, if any, color distortion is caused by the presence of the quenching dye.

The stabilizing effect of the quenching dyes on the photographic dyes can be stated in terms of quenching efficiency, if desired. Quenching efficiency is simply the ratio of the fading rate of the imaging dye in the absence of the quenching dye and the fading rate of the imaging dye in the presence of the quenching dye. We have observed that azomethine dyes employed as quenchers according to our teachings produce quenching efficiencies greater than 1.0. In preferred embodiments quenching efficiencies greater than 2.0 or even 5.0 can be obtained.

The azomethine dyes employed as quenchers in the practice of this invention can vary markedly in their quenching capacity, which is the number of quenching acts accomplished by the quencher before it is finally destroyed. If the quenching capacity is greater than 1.0, one molecule of quencher will prevent the decomposition of more than one imaging dye molecule before the quencher molecule is destroyed. If the quenching capacity is equal to 1.0, the quencher is sacrificial, that is, the decomposition of the quencher is substituted for that of the imaging dye on a one-to-one basis. If the quenching capacity is less than 1.0 more than one molecule of the quencher will be destroyed in protecting one imaging dye molecule from decomposition. It is, of course, preferred to employ quenchers having a capacity greater than 1.0. Specifically preferred are azomethine dyes which have a quenching capacity in excess of 2.0 and, most preferably, in excess of 10.0.

Although not essential to an understanding of the terms "quenching capacity" and "quenching efficiency", these terms are set out in somewhat greater detail in Belgium Patent 814,680, granted November 7, 1964, the disclosure of which is here incorporated by reference.

Where the process of this invention is employed to improve photographic elements which are image transfer film units, there are several types known with which it is effective, e.g., colloid transfer film units, silver salt diffusion transfer film units, imbibition transfer film units and color image transfer film units. Colloid transfer film units are described in Yutzy et al., U.S. Pat. Nos. 2,596,756 issued May 13, 1952 and 2,716,059 issued Aug. 23, 1953. Silver salt diffusion transfer film units are described in Rott U.S. Pat. No. 2,352,014 issued June 20, 1944; Land U.S. Pat. No. 2,543,181 issued Feb. 27, 1951; Yackel et al. U.S. Pat. No. 3,020,155 issued Feb. 6, 1962 and Land U.S. Pat. No. 2,861,885 issued Nov. 25, 1958. Imbibition transfer film units are described in Minsk U.S. Pat. No. 2,882,156 issued April 14, 1959. Color image transfer film units are described in Rogers U.S. Pat. No. 2,087,817 issued Apr. 30, 1963; 3,185,567 issued May 25, 1965 and 2,983,606 issued May 9, 1961; Weyerts et al. U.S. Pat. No. 3,253,915 issued May 31, 1966; Whitmore et al. U.S. Pat. No. 3,227,550 issued Jan. 4, 1966; Barr et al. U.S. Pat. No. 3,227,551 issued Jan. 4, 1966; Whitmore et al. U.S. Pat. No. 3,227,552 issued Jan. 4, 1966; Land U.S. Pat. Nos. 3,415,644; 3,415,645 and 3,415,646, all issued December 10, 1968; Rogers U.S. Pat. Nos. 3,594,164 and 3,594,165 issued July 20, 1971; and, Belgian Pat. Nos. 757,959 and 757,960 granted Apr. 23, 1971.

The quenchers and imaging dyes as well as their precursors employed in the practice of this invention can be used with silver halide emulsions. The silver halide emulsions can comprise, for example, silver chloride, silver bromide, silver bromoiodide, silver chlorobromide, silver chloroiodide, silver chlorobromoiodide crystals or mixtures thereof. The emulsions can be coarse or fine grain emulsions and can be prepared by a variety of techniques, e.g., single jet emulsions such as those described in Trivelli and Smith, *The Photographic Journal*, Vol. LXXIX, May, 1939 (pp. 330-338), double jet emulsions such as Lippmann emulsions, ammoniacal emulsions, thiocyanate or thioether ripened emulsions such as these described in Nietz et al. U.S. Pat. No. 2,222,264 issued Nov. 19, 1940; Illingsworth U.S. Pat. No. 3,320,069 issued May 16, 1967 and McBride U.S. Pat. No. 3,271,157 issued Sept. 6, 1966. Silver halide emulsions can form latent images predominantly on the surface of the silver halide grains, or predominantly on the interior of the silver halide grains such as those described in Davey et al. U.S. Pat. No. 2,592,250 issued May 8, 1952; Porter et al. U.S. Pat. No. 3,206,313 issued Sept. 14, 1965; Berriman U.S. Pat. No. 3,367,778 issued Feb. 6, 1968 and Bacon et al. U.S. Pat. No. 3,447,927 issued June 3, 1969. If desired, mixture of such surface and internal image-forming emulsions can be made, such being described in Luckey et al. U.S. Pat. No. 2,996,382 issued Aug. 15, 1961. Silver halide emulsions can be regular grain emulsions such as the type described in Klein and Moisar, *J. Phot. Sci., Vol.* 12, No. 5, Sept/Oct, 1964, pp. 242-251 and German Pat. No. 2,107,118. Negative type emulsions can be made, as well as direct positive emulsion as described in Leermakers U.S. Pat. No. 2,184,013 issued Dec. 19, 1939; Kendall et al. U.S. Pat. No. 2,541,472 issued Feb. 13, 1951; Schouwenaars British Pat. No. 723,019 issued Feb. 2, 1955; Illingsworth et al. French Pat. No. 1,520,821 issued Mar. 4, 1968; Illingsworth U.S. Pat. No. 3,501,307 issued Mar. 17, 1970; Ives U.S. Pat. No. 2,563,785 issued Aug. 7, 1951; Knott et al. U.S. Pat. No. 2,456,953 issued Dec. 21, 1948 and Land U.S. Pat. No. 2,861,885 issued Nov. 25, 1958.

The silver halide emulsions can be sensitized with chemical sensitizers, such as with: reducing; sulfur, selenium or tellurium compounds; gold, platinum or palladium compounds; or combinations of these. Procedures for chemically sensitizing silver haldie emulsions are described in Sheppard et al. U.S. Pat. No. 1,623,499 issued April 5, 1927; Waller et al. U.S. Pat. No. 2,399,083 issued Apr. 23, 1946; McVeigh U.S. Pat. No. 3,297,447 issued Jan. 10, 1967 and Dunn U.S. Pat. No. 3,297,446 issued Jan. 10, 1967.

Spectral sensitizing dyes can be used conveniently to confer additional sensitivity to light-sensitive silver halide emulsions of multilayer photographic elements, For instance, additional spectral sensitization can be obtained by treating the emulsions with a solution of a sensitizing dye in an organic solvent or the dye may be added in the form of a dispersion as described in Owens et al British Patent 1,154,781, published June 11, 1959. For optimum results, the dye can either be added to the emulsion as a final step or at some earlier stage.

Sensitizing dyes useful in sensitizing silver halide emulsions are described, for example, in Brooker et al U.S. Pat. No. 2,526,632, issued Oct. 24, 1950; Sprague U.S. Pat. No. 2,503,776, issued Apr. 11, 1950; Brooker et al U.S. Pat. No. 2,493,748, issued Jan. 10, 1950; and Taber et al U.S. Pat. No. 3,384,486, issued May 21, 1968. Spectral sensitizers which can be used include the cyanines, merocyanines, complex (tri- or tetranuclear) cyanines, holopolar cyanines, styryls, hemicyanines (e.g., enamine hemicyanines), oxonols and hemioxonols.

Dyes of the cyanine classes suitable for sensitizing silver halide can contain such basic nuclei as the thiazolines, oxazolines, pyrrolines, pyridines, oxazoles, thiazoles, selenazoles and imidazoles. Such nuclei can contain alkali, alkylene, hydroxyalkyl, sulfoalkyl, carboxyalkyl, aminoalkyl and enamine groups and can be fused to carbocyclic or heterocyclic ring systems either unsubstituted or substituted with halogen, phenyl, alkyl, haloalkyl, cyano, or alkoxy groups. The dyes can be symmetrical or unsymmetrical and can contain alkyl, phenyl, enamine or heterocyclic substituents on the methine or polymethine chain.

The merocyanine dyes can contain the basic nuclei mentioned above as well as acid nuclei such as thiohydantoins, rhodanines, oxazolidenediones thiazolidenediones, barbituric acids, thiazolineones, and malononitrile. These acid nuclei can be appropriately substituted with alkyl, alkylene, phenyl, carboxyalkyl, sulfoalkyl, hydroxyalkyl, alkoxyalkyl, alkylamino groups, or heterocyclic nuclei. Combinations of these dyes can be used, if desired. In addition, super-sensitizing addenda which do not absorb visible light can be included, for instance, ascorbic acid derivatives, azaindenes, cadmium salts, and organic sulfonic acids as described in McFall et al U.S. Pat. No. 2,933,390, issued Apr. 19, 1960; and Jones et al U.S. Pat. No. 2,937,089, issued May 17, 1960.

It is specifically contemplated to incorporate the azomethine quenching dyes in blue-sensitive (yellow dye imaging) and green-sensitive (magenta dye imaging) layers of color photographic elements.

The silver halide emulsions can contain development modifiers that function as speed increasing compounds such as polyalkylene glycols, cationic surface active agents and thioethers or combinations of these as described in Piper U.S. Pat. No. 2,886,437 issued May 12, 1959; Dann et al. U.S. Pat. No. 3,046,134 issued July 24, 1962; Carroll et al. U.S. Pat. No. 2,944,900 issued July 12, 1960 and Goffe U.S. Pat. No. 3,294,540 issued Dec. 27, 1966.

The silver halide emulsions can be protected against the production of fog and can be stabilized against loss of sensitivity during keeping. Useful antifoggants and stabilizers, each used alone, or in combination, include: a) thiazolium salts described in Brooker et al. U.S. Pat. No. 2,131,038 issued Sept. 27, 1938 and Allen et al. U.S. Pat. No. 2,694,716 issued Nov. 16, 1954; b) the azaindenes described in Piper U.S. Pat. No. 2,886,437 issued May 12, 1959 and Heimbach et al. U.S. Pat. No. 2,444,605 issued July 6, 1948; c) the mercury salts as described in Allen et al. U.S. Patent 2,728,663 issued December 27, 1955; d) the urazoles described in Anderson et al. U.S. Patent 3,287,135 issued Nov. 22, 1966; e) the sulfoctechols described in Kennard et al. U.S. Pat. No. 3,236,652 issued February 22, 1966; f) the oximes described in Carroll et al. British Patent 623,440 issued May 18, 1949; g) nitron; h) nitroindazoles; i) the mercaptotetrazoles described in Kendall et at. U.S. Patent 2,403,927 issued July 16, 1946; Kennard et al. U.S. Pat. No. 3,266,897 issued Aug. 16, 1966; and Luckey et al. U.S. Pat. No. 3,397,987 issued Aug. 20, 1968; j) the polyvalent metal salts described in Jones U.S. Pat. No. 2,839,405 issued June 17, 1958; k) the thiuronium salts described in Herz et al. U.S. Patent 3,220,839 issued November 30, 1965; and l) the palladium, platinum and gold salts described in Trivelli et al. U.S. Pat. No. 2,566,263 issued Aug. 28, 1951; and Yutzy et al. U.S. Pat. No. 2,597,915 issued May 27, 1952.

The photographic and other hardenable layers, particularly gelatin-containing layers, used in these silver halide-containing photographic elements can be hardened by various organic or inorganic hardeners, alone or in combination, such as those disclosed in Mees and James, *The Theory of the Photographic Process,* pp. 54–60, 3rd Ed., MacMillan. Typical useful hardeners include the aldehydes, and blocked aldehydes as described in Allen et al. U.S. Pat. No. 3,232,764 issued Feb. 1, 1966; ketones, carboxylic and carbonic acid derivatives; sulfonate esters; sulfonyl halides; vinyl sulfonyl ethers as described in Burness et al. U.S. Pat. No. 3,539,644 issued Nov. 10, 1970; active halogen compounds; epoxy compounds, aziridines; active olefins; isocyanates; carbodiimides; chlorotriazines as disclosed in Yamamoto et al. U.S. Pat. No. 3,325,287 issued June 13, 1967, Oishi et al. U.S. Pat. No. 3,362,827 issued January 9, 1968, Nishio et al. U.S. Pat. No. 3,394,006 issued July 23, 1968 and Meckl et al. U.S. Pat. No. 3,549,377 issued Dec. 22, 1970; polymeric hardeners such as oxidized polysaccharides like dialdehyde starch and oxyguargum; and the like.

The photographic silver halide emulsion layers and other layers on photographic elements can contain various colloids alone or in combination as vehicles. Suitable hydrophilic vehicle materials include both naturally-occurring substances such as proteins, for example, gelatin, gelatin derivatives, cellulose derivatives, polysaccharides such as dextran, gum arabic and the like; and synthetic polymeric substances such as water soluble polyvinyl compounds like poly(vinylpyrrolidone), acrylamide polymers and the like.

Photographic emulsion layers and other layers of photographic elements such as overcoat layers, interlayers and subbing layers, as well as receiving layers in image transfer elements can also contain alone or in combination with hydrophilic, water-permeable colloids, other synthetic polymeric vehicle compounds such as dispersed vinyl compounds such as in latex form and particularly those which increase the dimensional stability of the photographic materials. Typical synthetic polymers include those described in Nottorf U.S. Pat. No. 3,142,568 issued July 28, 1964; White U.S. Pat. No. 3,193,386 issued July 6, 1965; Houck et al. U.S. Pat. No. 3,062,674 issued Nov. 6, 1962; Houck et al. U.S. Pat. No. 3,220,844 issued Nov. 30, 1965; Ream et al. U.S. Pat. No. 3,287,289 issued Nov. 22, 1966; and Dykstra U.S. Pat. No. 3,411,911 issued Nov. 19, 1968. Other vehicle materials include those water-insoluble polymers of alkyl acrylates and methacrylates, acrylic acid, sulfoalkyl acrylates or methacrylates, those which have crosslinking sites which facilitate hardening or curing as described in Smith U.S. Pat. No. 3,488,708 issued Jan. 6, 1970, and those having recurring sulfobetaine units as described in Dykstra Canadian Pat. No. 774,054.

The photographic elements often contain antistatic or conducting layers. Such layers can comprise soluble salts, e.g. chlorides, nitrates, etc., evaporated metal layers, ionic polymers such as those described in Minsk U.S. Pat. No. 2,861,056 issued Nov. 18, 1958 and Sterman et al. U.S. Pat. No. 3,206,312 issued Sept. 14, 1965, or insoluble inorganic salts such as those described in Trevoy U.S. Pat. No. 3,428,451 issued Feb. 18, 1969.

Photographic layers, including silver halide emulsion layers of a photographic element, can be coated on a wide variety of supports. Typical supports include cellulose nitrate film, cellulose acetate film, poly(vinyl acetal) film, polystyrene film, poly(ethylene terephthalate) film, polycarbonate film and related films or resinous materials, as well as glass, paper, metal and the like. Typically, a flexible support is employed, especially a paper support, which can be partially acetylated or coated with baryta and/or an alpha-olefin polymer, particularly a polymer of an alpha-olefin containing 2 to 10 carbon atoms such as polyethylene, polypropropylene, ethylenebutene copolymers and the like.

The photographic layers can contain surfactants such as saponin; anionic compounds such as the alkyl aryl sulfonates described in Baldsiefen U.S. Pat. No. 2,600,831 issued June 17, 1952; amphoteric compounds such as those described in Ben-Ezra U.S. Pat. No. 3,133,816 issued May 19, 1964; and water soluble adducts of glycidol and an alkyl phenol such as those described in Olin Mathieson British Pat. No. 1,022,878 issued Mar. 16, 1966, and Knox U.S. Pat. No. 3,514,293 issued May 26, 1970.

Any quantity of quencher will bring about the improvements of this invention. There is, theoretically, no upper limit to the amount which can be employed, since having an excess will do no harm except possibly lend unwanted color to the article. It is preferred that there be at least 0.25 micromole of quencher or precursor thereof per gm of dispersing medium in photographic applications and most preferred that there be from about 2.5 micromole to about 250 micromoles of quencher or precursor thereof per gram of dispersing medium.

In general, the imaging dye (or precursor thereof) concentration will be equal to that ordinarily employed in color photography. These concentrations are well known to those of ordinary skill in the art of color photography. Preferably, the imaging dye or precursor will be present in the coating in a range of from about 2.5 micromole per gram of dispersing medium to about 250 micromoles per gram of dispersing medium. Most preferably, it will be present in a range of from about 25 micromoles per gram to about 150 micromoles per gram of dispersing medium.

As noted above, the imaging dyes employed in the practice of this invention have their longest wavelength absorption peaks below about 590 nm. It is preferred that the absorption peak of the imaging dye be of from about 400 nm to about 590 nm. Further, the quenching dye has its longest wavelength absorption peak above about 700 nm, preferably in the range of from about 700 nm to about 900 nm. and most preferably in the range of from about 700 nm to about 800 nm The following examples are included for a further understanding of the invention:

EXAMPLE 1

Part A

A 227 mg sample of I-15 dye was dissolved with heating in a mixture of 1.5 ml tricresyl phosphate and 10 ml 2-(2-butoxyethoxy)ethyl acetate. This solution was mixed with 44 ml of a 6.25% aqueous solution of bone gelatin and 2 ml of a 5% aqueous solution of tri-isopropyl naphthalene sulfonate. The mixture was immediately milled five times in a colloid mill with a final rinse of 10 ml of distilled water. The dispersion was then chilled in 4° C water until it was set.

The set dispersion was then noddled, washed in water for at least four hours and air dried. A 3.39 g portion of the dried dispersion was added to 25 ml of distilled water, refrigerated, and allowed to swell for four hours. The swelled dispersion was melted and to its was added 1 ml of a 7.5% aqueous solution of saponin. The volume was brought to 30 ml with water.

The 30 ml. of dispersion was coated at 10 ml/$ft^2$ to give final spreads of 49.8 mgs/$ft^2$ I-15, 380 mgs/$ft^2$ tricresyl phosphate and 600 mgs/$ft^2$ bone gelatin.

Part B

A second dispersion was made following the same procedure except that 82 mgs of F-22 dye ($\lambda_{max}$=717 nm) was added as a quencher in addition to the 227 mgs. of I-15 substrate dye ($\lambda_{max}$=532nm).

Part C

A sample strip of the coating of Part A was placed in the optical beam of a recording spectrophotometer and a spectrophotometric curve (optical density vs. wavelength in nanometers) was generated over the spectral range 400–700 nm.

The sample was then exposed to the light from a high intensity (5000 watt) xenon arc for 4 days. The light was filtered through a Wratten 2B filter to remove radiation below 400 nm. After the four day period, the sample was removed and placed in the spectrophotometer whereby a second curve, of lower maximum optical density than the first, was generated over the same area. This procedure was repeated for xenon arc exposure periods of 8, 12, 16 and 20 days.

Part D

The procedure of Part C was repeated using a sample of the coating of Part B.

EXAMPLE 5

Samples of supported single-layer gelatin coatings containing the imaging and quenchers indicated in TABLE II were subjected to 4-day Xenon light fading tests (Wratten 2B filter). The preparation procedures of Example 1, Part A, was employed and the testing procedure of Example 1, Part C, was employed.

TABLE I

| Example | Quenching Dye | Quencher γmax nm | Quenching Efficiency | Quenching Capacity | Quencher Concentration micromoles/gram |
|---|---|---|---|---|---|
| 1 | F-22 | 717 | large | 0.66 | 102.5 |
| 2 | G-3 | 723 | 17 | 7.40 | 150.0 |
| 3 | G-7 | 769 | 16 | large | 30.0 |
| 4 | G-2 | 719 | 11 | large | 122.0 |

TABLE II

| Imaging Dye Class | Imaging Dye | Imaging Dye γmax (nm) | Imaging Dye Concentration micromoles/gram | Quencher | Quencher Concentration micromoles/gram | Days Xenon | Dmax | % Density Loss |
|---|---|---|---|---|---|---|---|---|
| Azo | 29 | (587) | 31.3 | None | *N.A. | 0 | 0.34 | 89 |
| Azo | 29 | | 31.3 | None | N.A. | 4 | 0.04 | |
| Azo | 29 | 31.3 | G-7 | 31.3 | 0 | 0.36 | | |
| Azo | 29 | 31.3 | G-7 | 31.3 | 4 | 0.35 | 3 | |
| Anthraquinon | 40 | (508) | 62.6 | None | N.A. | 0 | 0.31 | |
| Anthraquinone | 40 | | 62.6 | None | N.A. | 4 | 0.20 | 35 |
| Anthraquinone | 40 | | 62.6 | G-9 | 31.3 | 0 | 0.32 | |
| Anthraquinone | 40 | | 62.6 | G-9 | 31.3 | 4 | 0.32 | 0 |
| Anthraquinone | 41 | (538) | 250.0 | None | N.A. | 0 | 0.48 | |
| Anthraquinone | 41 | | 250.0 | None | N.A. | 4 | 0.44 | 8 |
| Anthraquinone | 41 | | 250.0 | G-9 | 75.0 | 0 | 0.46 | |
| Anthraquinone | 41 | | 250.0 | G-9 | 75.0 | 4 | 0.46 | 0 |
| Formazan | 42 | (480) | 250.0 | None | N.A. | 0 | 1.38 | 80 |
| Formazan | 42 | | 250.0 | None | N.A. | 4 | 0.26 | 80 |
| Formazan | 42 | | 250.0 | G-9 | 75.0 | 0 | 1.50 | |
| Formazan | 42 | | 250.0 | G-9 | 75.0 | 4 | 1.02 | 32 |
| Formazan | 43 | (570) | 250.0 | None | N.A. | 0 | 1.52 | |
| Formazan | 43 | | 250.0 | None | N.A. | 4 | 0.16 | 90 |
| Formazan | 43 | | 250.0 | G-9 | 75.0 | 0 | 1.88 | |
| Formazan | 43 | | 250.0 | G-9 | 75.0 | 4 | 1.02 | 46 |
| Azine | 44 | (430) | 100.0 | None | *N.A. | 0 | 0.77 | |
| Azine | 44 | | 100.0 | None | N.A. | 4 | 0.22 | 71 |
| Azine | 44 | | 100.0 | G-9 | 50.0 | 0 | 1.12 | |
| Azine | 44 | | 100.0 | G-9 | 50.0 | 4 | 1.03 | 8 |
| Azine | 45 | (419) | 100.0 | None | N.A. | 0 | 2.06 | |
| Azine | 45 | | 100.0 | None | N.A. | 2 | 0.48 | 80 |
| Azine | 45 | | 100.0 | G-9 | 50.0 | 0 | 2.44 | |
| Azine | 45 | | 100.0 | G-9 | 50.0 | 2 | 1.52 | 38 |
| Azine | 46 | (510) | 47.0 | None | N.A. | 0 | 0.30 | |
| Azine | 46 | | 47.0 | None | N.A. | 4 | 0.05 | 83 |
| Azine | 46 | | 47.0 | G-9 | 50.0 | 0 | 0.39 | |
| Azine | 46 | | 47.0 | G-9 | 50.0 | 4 | 0.39 | 0 |

*N.A. = not applicable

Part E

Parts A and C were repeated using a sample containing only the quencher dye F-22.

From the above observations, the quenching efficiency and quenching capacity where determined as set out below in TABLE I. The imaging dye was in each instance present in a concentration of 132.5 micromoles per gram of tricresyl phosphate dispersing medium while the concentration of the quenching dye was as set out in TABLE I. The calculations to arrive at the quenching efficiency and capacity can be readily made by those skilled in the art. The Belgium patent 814,680, cited above, can be referred to for a detailed description of the calculations actually made.

EXAMPLES 2 - 4

In a manner similar to Example 1, a number of quenchers were tested for their effect on imaging dye I-15. The results are shown in TABLE I.

Although quenching dye G-9 has an absorption peak somewhat below 700 nm, and would not be employed in the practice of my invention (unless shifted bathochromically) since it would visibly alter the image hue, the utility of azomethine dyes in stabilizing various categories of imaging dyes is nevertheless illustrated. It would be expected that similar results could be obtained using quenchers having absorption peaks above 700 nm.

EXAMPLE 6

The following mordants, dyes and quencher are used in this example:

| Mordants | |
|---|---|
| Coacervate: | Combination of 10 parts 6 (1) and 1 part 6 (2). |
| 6 (1) | Methyl-tri-dodecylammonium bromide |
| 6 (2) | N-n-hexadecyl-N-morpholinium ethylsulfate (coated at concentration of about 3.3 × $10^{-7}$ moles/$cm^2$) |
| 6 (3) | Copoly[styrene-(N,N-diethyl-N-benzyl-N-3-maleiimidopropyl)ammonium]chloride |

-continued

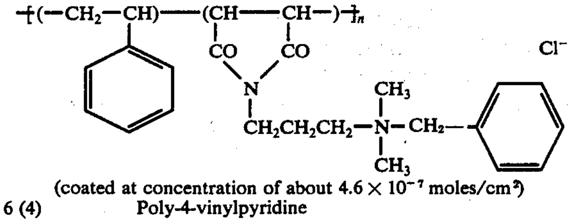

(coated at concentration of about 4.6 × $10^{-7}$ moles/$cm^2$)

6 (4) Poly-4-vinylpyridine

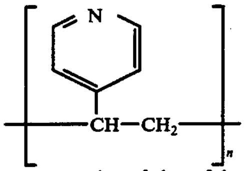

Dyes (coated at concentration of about 2.1 × $10^{-7}$ moles/$cm^2$)

6 (5) Dye 6 (5) was imbibed into the gelatin coating to a concentration of about 0.5 × $10^{-7}$ moles/$cm^2$.

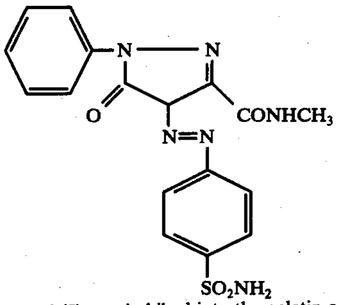

6 (6) Dye 6 (5) was imbibed into the gelatin coating to a concentration of about 0.5 × $10^{-7}$ moles/$cm^2$.

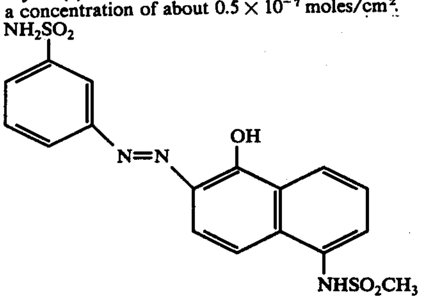

Quencher 6 (7)

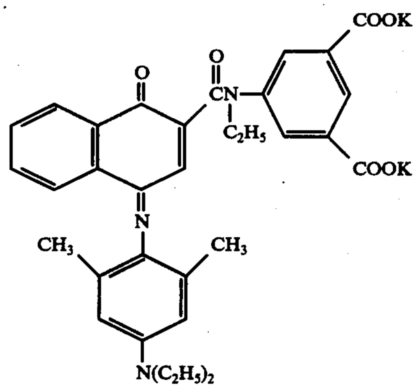

A. Samples of supported single-layer gelatin coatings containing per square foot of coating 200 mg. gelatin and 200 mg. of one of the three mordants listed in Table III and identified above were imbibed with one of the two mordantable image dyes also listed in Table III and identified above. Upon drying, the samples were subjected to radiation fading tests as described in Table III. The results are recorded in Table III.

B. The procedure described in Section A above was repeated with a separate set of samples of the same coatings into each of which was imbibed the quencher 6 (7) at an approximate concentration of 8 × $10^{-7}$ mole per square centimeter of coating. The results are also recorded in Table III.

TABLE III

Stabilization of Mordanted Dyes with Dye Quencher 6 (7) Against High-Intensity Xenon Radiation (4 Days)

| Dye | 6 (5) | | | | | |
|---|---|---|---|---|---|---|
| Mordant | Coacervate | | 6 (3) | | 6 (4) | |
| Buffer pH | 5.0 | 8.0 | 5.0 | 8.0 | 5.0 | 8.0 |
| *t½ of dye in days | 3.1 | 4.0 | 2.7 | 8.0 | 1.0 | 2.4 |
| t½ of dye and quencher in days | 128.0 | 51.0 | 16.2 | 12.9 | 3.6 | 14.0 |
| Stability increase with quencher (no filter) | 41.0x | 13.0x | 6.0x | 1.6x | 7.0x | 5.8x |
| t½ of dye in days (2B filter) | 3.4 | 5.2 | 3.7 | 10.0 | 3.5 | 2.8 |
| Stability increase with quencher (2B filter) | 1.5x | 32.0x | 4.7x | 1.6x | 1.5x | 5.9x |
| Dye | 6 (6) | | | | | |
| Mordant | Coacervate | | 6 (3) | | 6 (4) | |
| Buffer pH | 5.0 | 8.0 | 5.0 | 8.0 | 5.0 | 8.0 |
| *t½ of dye in days | 3.4 | 2.0 | 3.8 | 3.1 | 3.7 | 3.8 |
| t½ of dye and quencher in days | 30.7 | 9.9 | 8.6 | 5.1 | 7.7 | 7.3 |
| Stability increase with quencher (no filter) | 9.0x | 4.9x | 2.3x | 1.7x | 2.0x | 1.6x |
| t½ of dye in days (2B filter) | 4.5 | 2.8 | 4.5 | 4.7 | 4.2 | 4.7 |
| Stability increase with quencher (2B filter) | 1.8x | 3.5x | 20.0x | 1.5x | 2.6x | 1.6x |

*t½ = the time required to reduce imaging dye density to one half its original value.

EXAMPLE 7

Example 6 was repeated except that the quencher employed was:

7 (1)

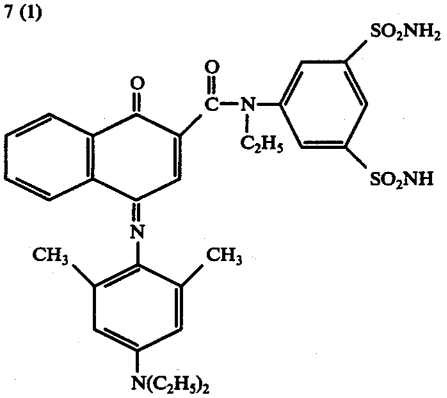

The results are shown in Table IV.

TABLE IV

Stabilization (without 2B Filter) of Mordanted Dyes with Dye Quencher 7 (1)

| Dye | 6 (5) | | | 6 (6) | | |
|---|---|---|---|---|---|---|
| Mordant | Coacervate | 6 (3) | 9 (4) | Coacervate | 6 (3) | 6 (4) |
| Buffer pH | 9.0 | 9.0 | 9.0 | 9.0 | 9.0 | 9.0 |
| γmax (nm) without quencher | 450.0 | 453.0 | 453.0 | 560.0 | 555.0 | 561.0 |
| O.D. at γmax | | | | | | |

TABLE IV-continued

| Stabilization (without 2B Filter) of Mordanted Dyes with Dye Quencher 7 (1) | | | | | | |
|---|---|---|---|---|---|---|
| Dye | 6 (5) | | | 6 (6) | | |
| Mordant | Coacervate | 6 (3) | 9 (4) | Coacervate | 6 (3) | 6 (4) |
| (without quencher) | 1.13 | 1.33 | 1.03 | 1.38 | 1.29 | 1.28 |
| t½ of dye in days (without quencher) | 3.2 | 13.7 | 2.5 | 1.1 | 2.7 | 2.1 |
| γmax (nm) (with quencher) | 448.0 | 443.0 | 458.0 | 565.0 | 560.0 | 565.0 |
| O.D. at γmax (with quencher) | 0.78 | 0.51 | 0.59 | 1.02 | 1.27 | 1.50 |
| t½ of dye in days (with quencher) | 7.8 | 21.1 | 15.6 | 5.3 | 4.1 | 5.1 |
| γmax of quencher (nm) | 708.0 | 715.0 | 705.0 | 710.0 | 715.0 | 713.0 |
| O.D. at γmax of quencher | 0.96 | 0.82 | 0.88 | 0.90 | 0.93 | 1.01 |
| t½ of quencher in days | 6.0 | 3.2 | 4.8 | 7.5 | 5.0 | 7.4 |
| Stability increase with quencher | 2.4x | 1.5x | 6.2x | 4.8x | 1.5x | 2.4x |

O.D. = optical density

The invention has been described with particular reference to preferred embodiments thereof but it will be understood that variations and modifications can be effected within the spirit and scope of the invention.

We claim:

1. A method of forming an image having improved stability in a photographic element containing a photosensitive silver halide emulsion layer, comprising associating in the element (i) a photographic coupler capable of reacting with the oxidized form of a pre-selected primary aromatic amine developing agent to form an imaging dye having an absorption peak below 590 nm, and (ii) a photographic coupler capable of reacting with the oxidized form of the pre-selected developing agent to form an azomethine dye having an absorption peak above 700 nm, imagewise exposing the element, developing the element with the pre-selected developing agent to form the imaging dye and the azomethine dye.

2. A method of forming an image having improved stability according to claim 1, wherein the imaging dye is produced from a photographic coupler containing a 5-pyrazolone moiety.

3. A method of forming an image having improved stability according to claim 2 wherein the imaging dye is produced from a photographic coupler having the following structure:

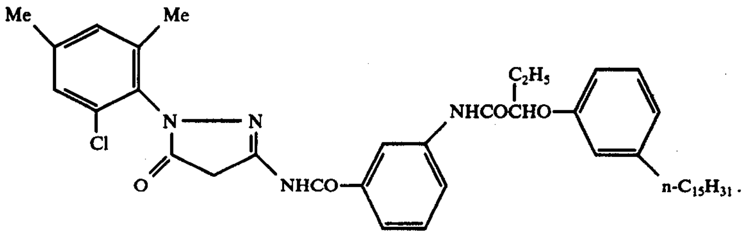

4. A method of forming an image having improved stability according to claim 1 wherein the azomethine dye is produced from a photographic coupler chosen from the class consisting of

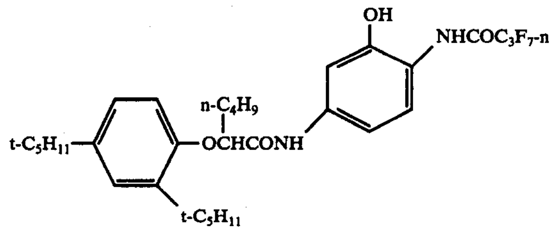
,

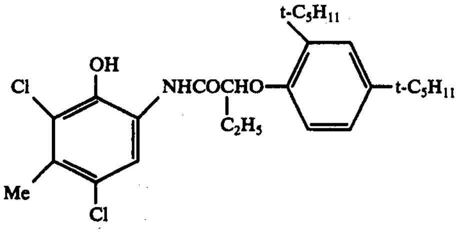
,

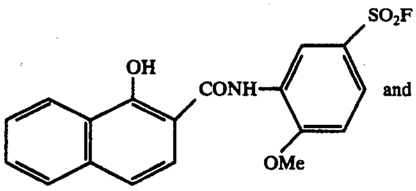
and

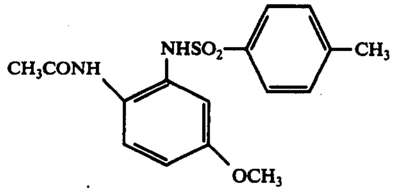

5. In a photographic element comprised of a support and a dye image in at least one layer containing a photographic imaging dye having an absorption peak below 590 nm, wherein said dye image is formed as a result of silver halide development, the improvement comprising an azomethine dye having an absorption peak above 700 nm associated with said imaging dye within said layer in an amount sufficient to reduce the rate of fading of said dye image upon exposure to visible or ultraviolet radiation.

6. In a photographic element according to claim 5, the further improvement wherein said azomethine dye has a quenching efficiency in combination with said imaging dye of greater than 2.0.

7. In a photographic element according to claim 5, the further improvement wherein said azomethine dye has a quenching efficiency in combination with said imaging dye of greater than 5.0.

8. In a photographic element according to claim 5, the further improvement wherein said azomethine dye has a quenching capacity in combination with said imaging dye of greater than 1.0.

9. In a photographic element according to claim 8, the further improvement wherein said azomethine dye has a quenching capacity in combination with said imaging dye of greater than 2.0.

10. In a photographic element according to claim 9, the further improvement wherein said azomethine dye has a quenching capacity in combination with said imaging dye of greater than 10.0.

11. In a photographic element according to claim 5, the further improvement in which said azomethine dye and said imaging dye are both present in a common dispersing medium within said layer.

12. In a photographic element according to claim 11, the further improvement wherein said azomethine dye is present within said dispersing medium of said layer in an amount of at least 0.25 micromole of said azomethine dye per gram of said dispersing medium.

13. In a photographic element according to claim 12, the further improvement wherein said azomethine dye is present within said dispersing medium of said layer in an amount of from 2.5 to 250 micromoles of said azomethine dye per gram of said dispersing medium.

14. In a photographic element according to claim 5, the further improvement wherein said azomethine dye exhibits an absorption peak in the range of from 700 to 900 nm in wavelength.

15. In a photographic element according to claim 5, the further improvement wherein said imaging dye is chosen from the class consisting of azine, anthraquinone, azo, azomethine, and formazan dyes.

16. In a photographic element according to claim 11, the further improvement wherein said imaging dye is present within said dispersing medium of said layer in an amount of from 2.5 to 250 micromoles of said imaging dye per gram of said dispersing medium.

17. In a photographic element according to claim 16, the further improvement wherein said imaging dye is present within said dispersing medium of said layer in an amount of from 25 to 150 micromoles of said imaging dye per gram of said dispersing medium.

18. In a photographic element according to claim 5, the further improvement wherein said imaging dye is a magenta dye.

19. In a photographic element according to claim 11, the further improvement wherein said dispersing medium is a coupler solvent.

20. In a photographic element according to claim 5, the further improvement wherein said imaging dye is a yellow dye.

21. In a photographic element according to claim 18, the further improvement wherein said magenta dye contains a 5-pyrazolone moiety.

22. In a photographic element comprised of a support and at least one layer containing a photographic dye image formed by an azomethine dye having an absorption peak below 590 nm in wavelength, said azomethine dye being located in said layer within a dispersing medium, the improvement comprising an azomethine dye having an absorption peak above 700 nm located within said dispersing medium within said layer in an amount of at least 0.25 micromole per gram of said dispersing medium.

23. In a photographic element according to claim 22, the further improvement wherein said azomethine dye having an absorption peak above 700 nm is chosen from the class consisting of

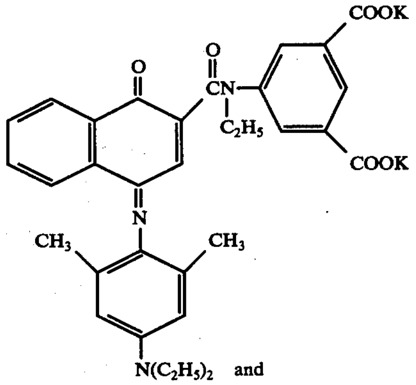

and

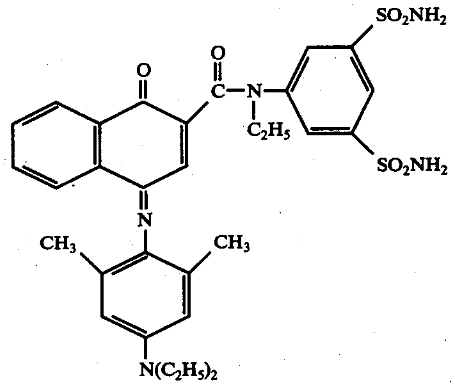

24. In a photographic element according to claim 22, the further improvement wherein said azomethine dye having an absorption peak below 590 nm in wavelength is chosen from the class consisting of

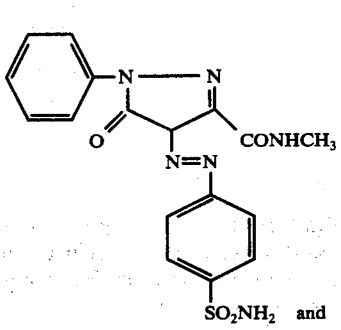

and

-continued

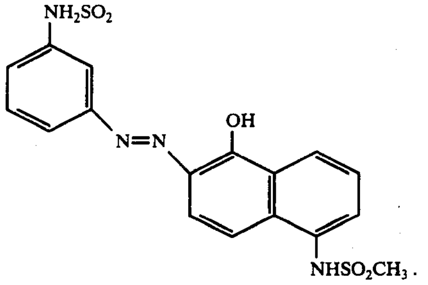

25. A method for preserving the appearance upon exposure to visible or ultraviolet radiation of a dye image in a photographic element containing in at least one layer an imaging dye having its absorption peak below 590 nm, wherein said dye image is formed as a result of silver halide development, comprising associating with the imaging dye within said layer, in an amount sufficient to reduce the rate of fading thereof, an azomethine dye having its absorption peak above 700 nm.

26. A method for preserving the appearance of a dye image in a photographic element according to claim 25 wherein the imaging dye is chosen from the class consisting of

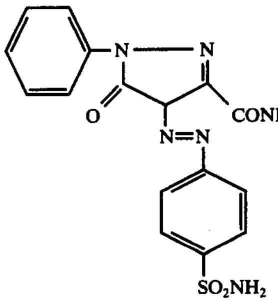

and

-continued

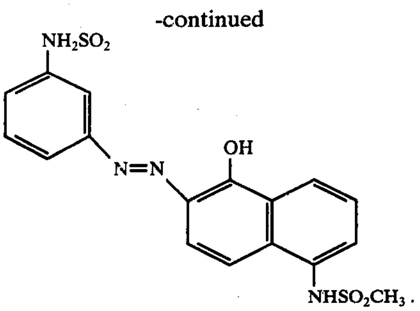

27. A method for preserving the appearance of a dye image in a photographic element according to claim 25 wherein the azomethine dye having its absorption peak above 700 nm is chosen from the class consisting of

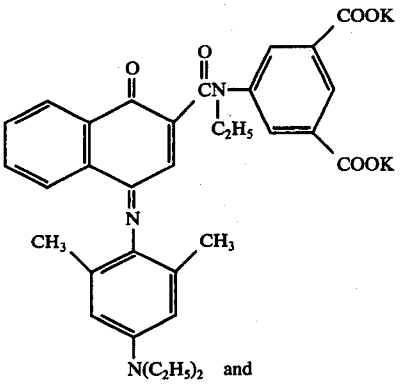

and

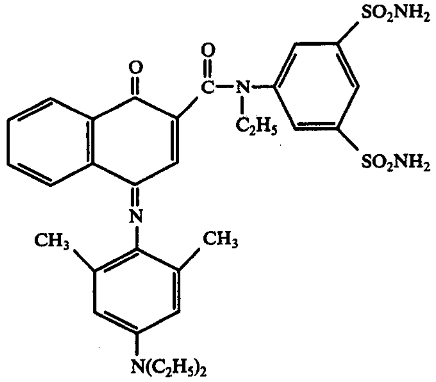

* * * * *